United States Patent
Du et al.

(10) Patent No.: US 9,322,521 B2
(45) Date of Patent: Apr. 26, 2016

(54) LIGHTING DEVICE

(75) Inventors: Rui Du, Beijing (CN); Pingping Huang, Beijing (CN); Xiaoyi Duan, Beijing (CN); Jiefei Wu, Beijing (CN)

(73) Assignees: BOE TECHNOLOGY GROUP CO., LTD., Beijing (CN); SUZHOU BOE CHATANI ELECTRONICS CO., LTD., Suzhou (CN)

( * ) Notice: Subject to any disclaimer, the term of this patent is extended or adjusted under 35 U.S.C. 154(b) by 883 days.

(21) Appl. No.: 13/474,116

(22) Filed: May 17, 2012

(65) Prior Publication Data

US 2012/0306371 A1    Dec. 6, 2012

(30) Foreign Application Priority Data

Jun. 3, 2011    (CN) .................... 2011 2 0187149 U

(51) Int. Cl.
  *F21S 6/00*    (2006.01)
  *F21V 23/04*    (2006.01)
  *H05B 37/02*    (2006.01)

(52) U.S. Cl.
  CPC .............. *F21S 6/00* (2013.01); *F21V 23/0471* (2013.01); *H05B 37/0227* (2013.01); *Y02B 20/44* (2013.01)

(58) Field of Classification Search
  CPC ... H05B 37/0227; F21V 23/0471; F21S 6/00; Y02B 20/44

USPC ......... 315/113, 201, 291, 297, 307–308, 300, 315/302
See application file for complete search history.

(56) References Cited

U.S. PATENT DOCUMENTS

| | | | |
|---|---|---|---|
| 2002/0024653 A1* | 2/2002 | Jung et al. ........................ | 356/73 |
| 2003/0102688 A1* | 6/2003 | Bingle et al. .................... | 296/76 |
| 2006/0044800 A1* | 3/2006 | Reime ............................. | 362/276 |
| 2010/0012016 A1* | 1/2010 | Viala ............................... | 116/75 |
| 2010/0244752 A1* | 9/2010 | Van Endert et al. ........... | 315/363 |
| 2011/0012433 A1* | 1/2011 | Parsons .............. | H05B 37/0227 307/117 |
| 2011/0051414 A1* | 3/2011 | Bailey et al. ................... | 362/235 |
| 2011/0133655 A1* | 6/2011 | Recker et al. ................. | 315/159 |

* cited by examiner

*Primary Examiner* — Tuyet Vo
*Assistant Examiner* — Henry Luong
(74) *Attorney, Agent, or Firm* — Ladas & Parry LLP

(57) ABSTRACT

An embodiment discloses a lighting device, comprising a lamp holder, a lamp panel, a lamp base, wherein the lamp panel includes a light source and located in the lamp holder, the lamp holder is connected to the lamp base, a physical displacement control module, and a power supply driver module placed in the lamp base, wherein the physical displacement control module is connected to the power supply driver module, adapted to control the power supply driver module to change an output signal to the lamp panel according to detected physical displacement, and the power supply driver module affords power supply to the physical displacement control module.

8 Claims, 2 Drawing Sheets

LIGHTING DEVICE

BACKGROUND

The embodiments of the present disclosure relate to a lighting device.

At present the application of a pyroelectric sensor in a light fixture is primarily for determining whether a human body enters into a detecting zone and then automatically controlling the switch of the light fixture; however, the sensor for such application produces response only based on the motion of the human body (heat source) and have no response to human body (heat source) in a standstill state in the detecting zone. Even an array composed of a plurality of pyroelectric sensors can not determine whether the heat source is in a standstill state. The ultrasonic sensor techniques are mainly used for distance measuring and vehicle astern running application, capable of determining an object distance based on reflected signals, but has no selectivity for a reflecting body, leading to many incorrect operations when used directly for light fixtures and having no direction determination.

In light emitting diode (LED) illumination (or lighting) and dimming techniques, the existent LED illumination dimming needs an input equipment, such as a key-board, touching pad, remote controller or wireless computer operation etc., affecting appearance rating or cost.

Therefore, existing light fixtures are unable to perfectly control looming by sensing physical displacement, especially a human body at a standstill state in the detecting zone, thus automatic control of light fixtures can not be achieved.

SUMMARY

One or more embodiments of the disclosed technology provide a lighting device to control effectively the looming by detecting physical displacement, especially detecting human body at a standstill state in the detecting zone.

One embodiment of the present disclosure provides a lighting device, comprising a lamp holder, a lamp panel, a lamp base, wherein the lamp panel includes a light source and located in the lamp holder, the lamp holder is connected to the lamp base, a physical displacement control module, and a power supply driver module placed in the lamp base, wherein the physical displacement control module is connected to the power supply driver module, adapted to control the power supply driver module to change an output signal to the lamp panel according to detected physical displacement, and the power supply driver module affords power supply to the physical displacement control module.

In one example, the lighting device can realize effective control of looming through a physical displacement detecting module, a control module and a power supply driver module, and realize the detecting of a human body heat source at a standstill state in the detecting zone through a sensor detecting plane comprises a pyroelectric sensor and ultrasonic sensor, for example.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein.

DETAILED DESCRIPTION

A further detailed description about specific embodiments of examples of the present disclosure was made with reference to the drawings and examples. The following embodiments are used to illustrate the examples of the present disclosure only but not limit the scope of the embodiments of the present disclosure.

Figure 1:
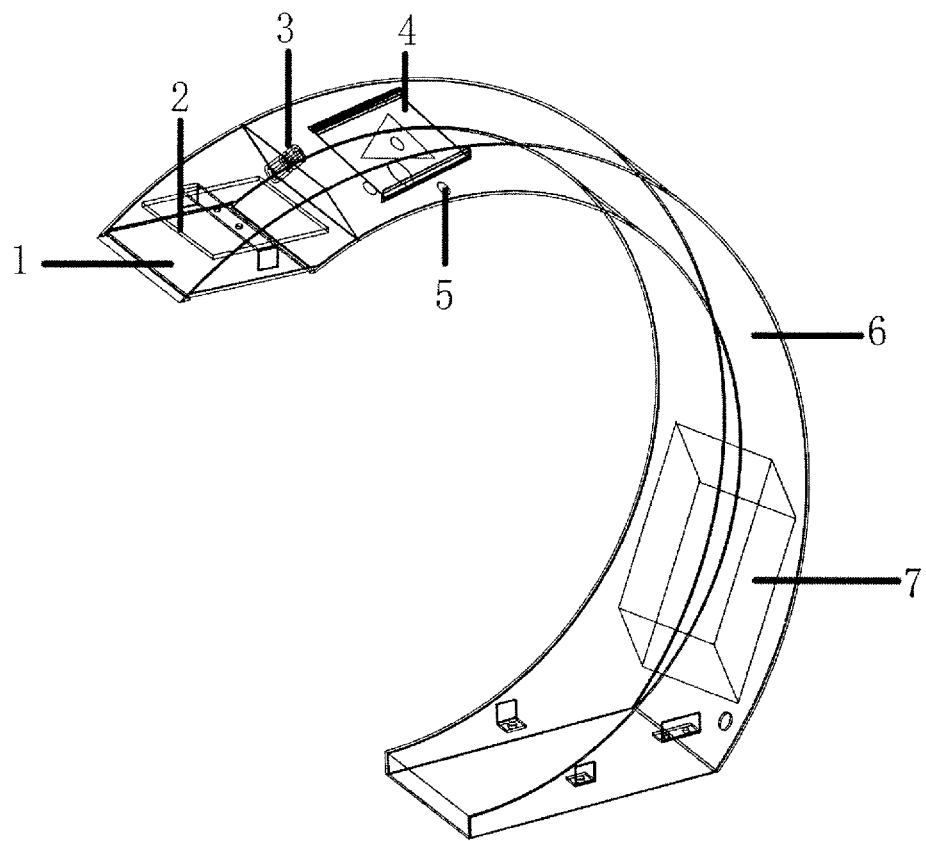
FIG. 1 is a structural schematic view of a lighting device according to an embodiment of the present disclosure.

As show in FIG. 1, a structural schematic view of a lighting device according to an embodiment of the present disclosure. In this embodiment, a desk lamp is taken as an example for the illustration purpose. The lighting device includes a lamp holder 1, a lamp panel 2 containing lamp beads as a light source, a lamp base 6, a physical displacement control module 4 and a power supply driver module 7 placed in the lamp base 6. Here, the lamp panel 2 is located within the lamp holder 1. For example, light-emitting diodes (LEDs) are adopted as the example of lamp beads; other kinds of light source such as fluorescent lamp can be used also. The lamp holder 1 is connected to lamp base 6, and in order to regulate the illuminating direction, the connection between them may be a dismountable connection, and for example a rotary bayonet 3 is used to connect the lamp holder 1 with lamp base 6 in this embodiment. To avoid overheating of the lamp holder 1 caused by the heat produced by the LEDs, a heat radiator is further arranged within lamp holder 1. Here, the external shape and internal structure of the lamp holder 1 and the lamp base 6 as shown in FIG. 1 are for illustration only but not limit the scope of the disclosure.

The physical displacement control module 4 connects with a power supply driver module 7, for controlling the power supply driver module 7 to change output signals to the lamp panel 2 according to different situations of detected physical displacement. The power supply driver module 7 affords power supply for the lamp panel 2 and the physical displacement control module 4.

Figure 2:
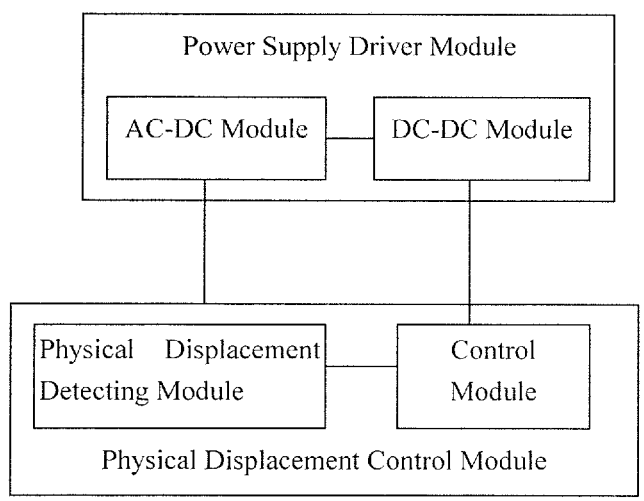
FIG. 2 is a relational graph showing the electric connection between the physical displacement control module and power supply driver module of FIG. 1.

As shown in FIG. 2, the physical displacement control module 4 may include a physical displacement detecting module and a control module, for example a microcontroller control module connected thereto the physical displacement detecting module. The control module may be another suitable type of control module other than the microcontroller control module, for example, a digital signal processer (DSP) control module.

The physical displacement detecting module is used for detecting displacement signal of a human body, and includes a sensor detecting plane, and in one example may further include an amplifying circuit.

Figure 3:
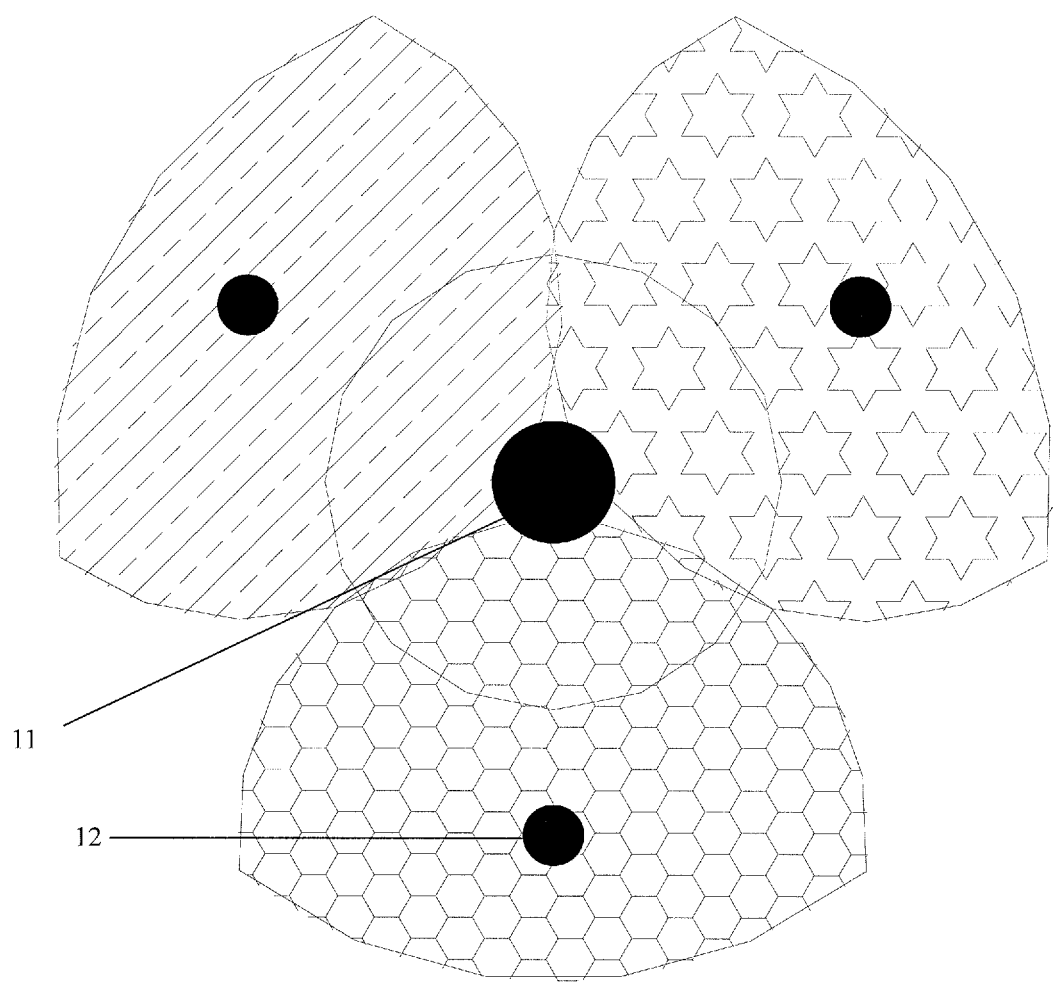
FIG. 3 is a structural schematic view of the sensor detecting plane of the physical displacement detecting module in FIG. 2.

The sensor detecting plane is used for detecting a human body heat source, and determining the displacement signal of the human body based on the signals about heat source. In order to detect the human body heat source at a standstill state in the detecting zone, the sensor detecting plane may include at least one displacement detecting sensor and a distance detecting sensor, respectively for detecting the displacement and the distance of the human body with respect to the sensor, thereby detecting physical displacement signals within the sensor detecting plane. In this embodiment, a pyroelectric sensor is adopted for the displacement detecting sensor, and an ultrasonic sensor is adopted for the distance detecting sensor. To detect a large zone, as shown in FIG. 3, the sensor detecting plane of this embodiment includes three pyroelectric sensors and one ultrasonic sensor; the ultrasonic sensor 11 is located at the center (the black circle at the center of FIG. 3), and three pyroelectric sensors 12 are placed around the ultrasonic sensor (the black circles at the periphery). In order to achieve an uniform coverage and decrease overlay region so that a sensible detection can be performed within the entire coverage, in this embodiment, three pyroelectric sensors are located on the same circumference with the ultrasonic sensor as a center of circle, preferably, the angle between the lines connecting any two pyroelectric sensors 12 with the ultrasonic sensor 11 is 120°. The detection limits, as shown by shadow region in the drawing, can be seen covering a large area and the overlay region is small. It should be noted that the arrangement as shown in FIG. 3 is an example, another suitable arrangement can be adopted; for example, there may be four pyroelectric sensors around the ultrasonic sensor, and these pyroelectric sensors may be located on different circles with respect to the central ultrasonic sensor.

To regulate the dimensions of the detecting zone, a detecting zone regulating device 5 may be further positioned below the sensor detecting plane. In this embodiment, the detecting zone regulating device 5 comprises at least one lens and a dimension-adjustable aperture, and the detecting zone is variable by the regulation by the aperture and the lens. Modifying the dimension of the aperture may decrease or increase the detecting plane, modifying the curved surface of the lens may revise the sensitivity and detection limits at the detecting vertical plane, and a reasonable aperture size cooperates with lens having a suitable curved surface can depress misjudgment or incorrect operation.

An amplifying circuit is used to amplify the displacement signals detected by the sensor detecting plane and transmit the amplified displacement signals to the control module (e.g., microcontroller control module). The control module is used for controlling the power supply driver module to change output signal to the lamp panel 2 according to the displacement signals.

In an example, the power supply driver module 7 may comprises an AC-DC module and a DC-DC module connected thereto. The AC-DC module is used for transforming input alternate current voltages into direct current constant voltages, and inputting the direct current constant voltages into the DC-DC module. The AC-DC module is further used as a power supply for the physical displacement control module 4. The DC-DC module is used for converting the direct current constant voltages into a constant current and inputting it to the lamp panel 2, or changing the constant current according to the control of physical displacement control module 4 and inputting the changed constant current to the lamp panel 2. Specifically, the DC-DC adjusts the effective current supplied to the lamp panel 2 according to the control signals input by the control module, and regulates dark-and-light variation or color variation. Provided that the control module outputs pulse width modulation (PWM) signals to the DC-DC module, the DC-DC module regulates the overall magnitude of the output effective currents based on the variation of the PWM duty cycle. Provided that the control module outputs control (CTRL) signals to the DC-DC module, the DC-DC module cooperates with the switching (e.g., triode switching) therein to shut off the power supply to the LEDs.

An exemplary working process of the lighting device according to the embodiment of the present disclosure is as follows:

When an detecting object such as a human hand is moving within the detection limits, each pyroelectric sensor and ultrasonic sensor successively produce response signals based on the displacement direction and output the signals to the microcontroller control module after amplification, and the microcontroller control module determines the displacement direction according to the variation of data at each receive ports, then changes the data at the output port based pre-set output signals, thus controls the DC-DC module.

When the human hand stays within the detection limits, the pyroelectric sensors do not produce response signals, but the ultrasonic sensor is still able to produce different response signals based on the distance from the human hand to the sensor detecting plane and transmit them to the microcontroller control module after amplification, and the microcontroller control module changes the data at the output port according to the staying distance and staying time, thus controls the DC-DC module.

As the human hand leaves the detection limits completely, there are no response signals from the sensors, and the microcontroller control module is brought into a standby state.

A more specific exemplary operation modes can be as follows.

1) When a human hand swifts through the sensor detecting plane 1 from right to left for the first time, the LED light source is darkened by one level, and when swifting through the sensor detecting plane 1 from right to left for the second time, the LED light source is further darkened by one level, and in such a similar way, after swifting through the sensor detecting plane 1 from right to left for the Nth time, the LEDs go out finally; and vice versa, when the human hand swifts through the sensor detecting plane 1 from left to right for the first time, the LED light source is lightened by one level, and when swifting through the sensor detecting plane 1 from left to right for the second time, the LED light source is further lightened by one level, and in such a similar way, after swifting through the sensor detecting plane 1 from left to right for the Nth time, the LED reaches the brightness of the order of 100%.

2) When a human hand enters the sensor detecting plane from right to left and stays below the sensor detecting plane for more than 1.5 seconds, the LED light source is darkened gradually (linearly) until the LEDs go out or the human hand moves out of the sensor detecting plane; and vice versa, when the human hand enters the sensor detecting plane from left to right and stays below the sensor detecting plane for more than 1.5 seconds, the LED light source is lightened gradually until the LED reaches the 100% brightness or the human hand moves out of the sensor detecting plane.

3) When a human hand moves vertically below the sensor detecting plane and the vertical distance from the human hand to the sensor detecting plane varies, if the human hand moves upward vertically, that is, the vertical distance from the sensor detecting plane gets smaller, the LEDs are darkened gradually until go out, or until the human hand move away from the sensor detecting plane. On the contrary, if the human hand moves downward vertically, that is, the vertical distance from the sensor detecting plane gets larger, the LEDs are lightened linearly until reaches the 100% brightness, or until the human hand moves away from the sensor detecting plane.

The LEDs can maintain the current state after human hand moves out of the sensor detecting plane. The time, distance, step, and motion directions of a human hand above described can be pre-set according to actual demands by changing the parameters of the lens, the aperture or the control module so as to enable the control module output for example corresponding PWM or CTRL to control DC-DC, thus the control of the LEDs can be achieved. Absolutely, different time, distance, step, and motion directions of a human hand or the parameters in the control module can be set to control the brightness and color variation of the color LEDs.

The embodiments of the present disclosure may apply to various light fixtures of different types, and the light fixtures may also adopt various different lamp beads.

The above embodiments are used only for explaining the examples of the present disclosure, but not limiting the examples of the present disclosure, the skilled ones in related prior art can make various modifications and variations without departing from the spirit and scope of the examples of the present disclosure, therefore all equivalent technical solutions fall into the scope of the examples of the present disclosure, and the patent protective scope of the examples of the present disclosure should be defined by claims.

What is claimed is:

1. A lighting device, comprising:
    a lamp holder,
    a lamp panel,
    a lamp base, wherein the lamp panel includes a light source and located in the lamp holder, the lamp holder is connected to the lamp base,
    a physical displacement control module, and
    a power supply driver module placed in the lamp base, wherein the physical displacement control module is connected to the power supply driver module, adapted to control the power supply driver module to change an output signal to the lamp panel according to detected physical displacement, and the power supply driver module affords power supply to the physical displacement control module,
    wherein the physical displacement control module includes a physical displacement detecting module and a control module,
    the physical displacement detecting module comprises a sensor detecting plane comprising at least one displacement detecting sensor and one distance detecting sensor, for detecting physical displacement within a detection scope of the sensor detecting plane;
    the control module is adapted for controlling the power supply driver module to change output signals to the lamp panel according to the physical displacement,
    wherein the sensor detecting plane comprises three displacement detecting sensors and one distance detecting sensor, and the distance detecting sensor located at a center and the three displacement detecting sensors placed around the distance detecting sensor,
    wherein the three displacement detecting sensors are located on a same circumference with the distance detecting sensor as a center of circle; and the angle between the lines connecting any two of the displacement detecting sensors and the distance detecting sensor is 120°, and
    wherein the displacement detecting sensors comprise pyroelectric sensors and the distance detecting sensor comprises an ultrasonic sensor.

2. The lighting device according to claim 1, further comprising a detecting zone regulating device that is arranged below the sensor detecting plane for regulating the sensing scope of the sensor detecting plane.

3. The lighting device according to claim 2, wherein the detecting zone regulating device comprises at least one lens and a dimension-adjustable aperture.

4. The lighting device according to claim 1, wherein the physical displacement detecting module further comprises an amplifying circuit, adapted to amplify displacement signal and transmit the amplified displacement signal to the control module.

5. The lighting device according to claim 1, wherein the power supply driver module includes an AC-DC module and a DC-DC module connected thereto,
    the AC-DC module is adapted for transforming an input alternate current voltage into a direct current constant voltage, and inputting the direct current constant voltage into the DC-DC module;
    the DC-DC module is used for converting the direct current constant voltage into a constant current and inputting the current to the lamp panel, or changing the constant current and inputting the changed constant current to the lamp panel.

6. The lighting device according to claim 1, further comprising:
    a rotary bayonet, which rotatably connects the lamp holder onto the lamp base; and
    a heat radiator used for heat dissipation of the lamp panel.

7. The lighting device according to claim 1, wherein the light source comprises light-emitting diodes (LEDs).

8. The lighting device according to claim 1, wherein the control module comprises a microcontroller control module or a digital signal processor (DSP) control module.

* * * * *